United States Patent [19]

Peterson

[11] Patent Number: 5,011,361

[45] Date of Patent: Apr. 30, 1991

[54] VEHICLE MOUNTABLE CARRIER FOR THREE-WHEELED SCOOTER AND THE LIKE

[76] Inventor: Edward A. Peterson, 3240 Delaware St., Chandler, Ariz. 85225

[21] Appl. No.: 263,243

[22] Filed: Oct. 27, 1988

[51] Int. Cl.⁵ .............................................. B60P 9/00
[52] U.S. Cl. ................................... 414/462; 414/545; 224/42.03 B; 224/42.08
[58] Field of Search ............... 414/462, 537, 540, 545, 414/921; 280/769; 224/42.03 R, 42.03 A, 42.03 B, 42.07, 42.08

[56] References Cited

U.S. PATENT DOCUMENTS

| | | | |
|---|---|---|---|
| 4,297,069 | 10/1981 | Worthington | 414/462 |
| 4,400,129 | 8/1983 | Eisenberg et al. | 414/462 |
| 4,671,729 | 6/1987 | McFarland | 414/462 |
| 4,695,218 | 9/1987 | Boyer | 414/462 |
| 4,705,448 | 11/1987 | Mungons | 414/462 |
| 4,738,581 | 4/1988 | Kuhlman | 414/462 |
| 4,741,660 | 5/1988 | Kent | 414/462 |
| 4,775,282 | 10/1988 | Van Vliet | 414/462 |
| 4,797,042 | 1/1989 | McFarland | 414/462 |

*Primary Examiner*—Robert P. Olszewski
*Assistant Examiner*—Boris Milef
*Attorney, Agent, or Firm*—Gregory J. Nelson

[57] ABSTRACT

A carrier for scooters of the type used by disabled persons, which carrier is attachable to a motor vehicle. The carrier has a mast with a power lift which moves a foldable platform between a lowered and a raised position. A weight-sensitive pedal on the platform responds to the presence of a load and defeats the platform fold-up mechanism. In the absence of a load, the platform will assume a folded position against the mast when raised. A fold-down lever with an attached foot pivots to engage the scooter when the platform is raised in a horizontal position with a load thereon.

11 Claims, 5 Drawing Sheets

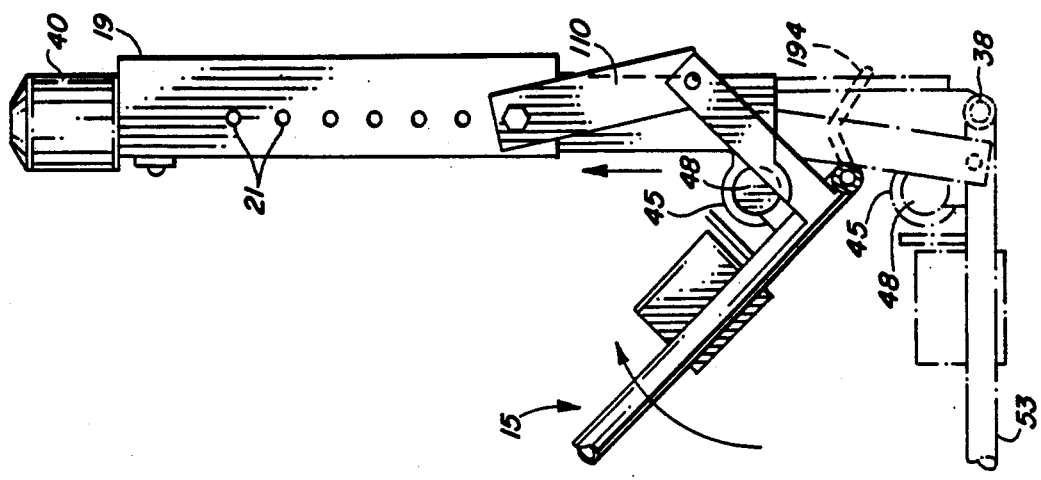
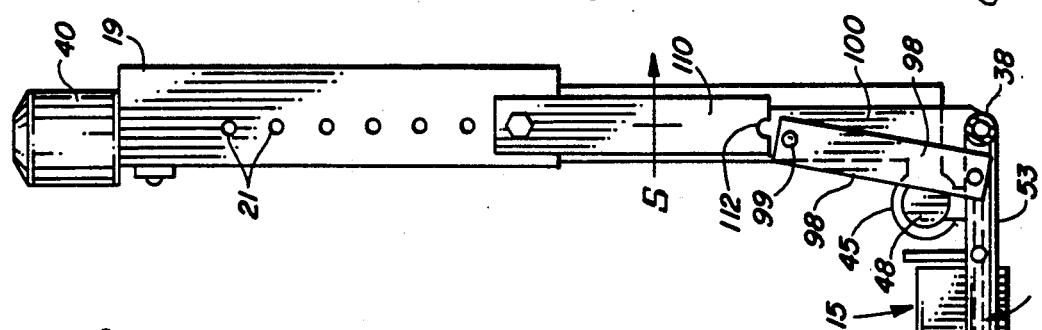
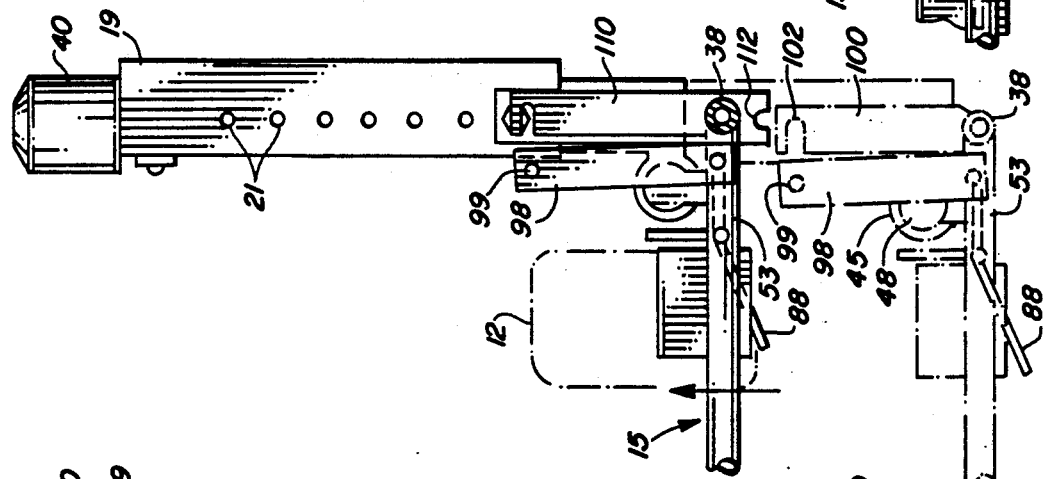
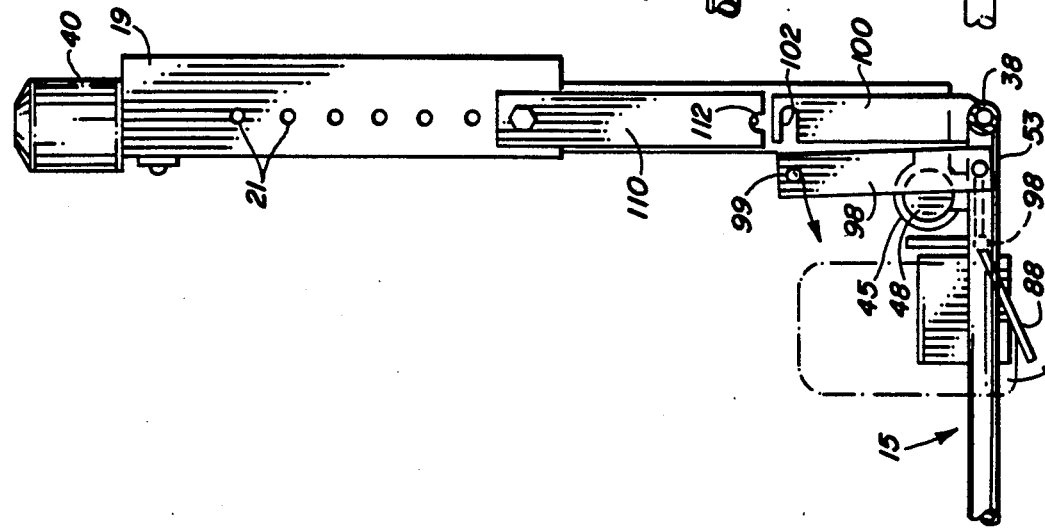

VEHICLE MOUNTABLE CARRIER FOR THREE-WHEELED SCOOTER AND THE LIKE

The present invention relates to a carrier attachable to a motor vehicle for lifting, lowering and carrying an auxiliary vehicle. More particularly, the present invention relates to a carrier mountable to the chassis of a vehicle for conveying an auxiliary vehicle and for loading and unloading such a vehicle, particularly three-wheeled vehicles or scooters of the type used by people who have ambulatory limitations.

Many people who have difficulty walking or who are otherwise disabled utilize three-wheeled electric scooters which are operated through the use of hand controls. One difficulty encountered by such individuals is the lack of a convenient means of transporting such carts from one location to another. Various carriers and platforms may be found in the prior art for receiving and transporting various auxiliary vehicles such as motorcycles, bicycles, wheelchairs and the like. While there are a wide variety of such attachable carriers adapted for transporting small vehicles, few are adapted for use for lifting and lowering and transporting relatively heavy three-wheeled scooters. Further, few of such prior art devices have the ability to be raised and lowered for convenient loading and unloading of the carried object. The invention described herein is a carrier attachable to a motor vehicle which overcomes most of the problems and deficiencies that exist in prior art transport devices.

U.S. Pat. No. 4,695,218 shows a carrier attachment adapted to engage the trailer hitch of a motor vehicle. The carrier includes a tube supporting an electric motor at the upper of the tube end which motor operates a screw jack. The exposed section of the screw jack is pivotally attached to a platform beneath a pivoting arm extending from the tube. A clamping arm is also included which is positionable over the platform. The platform may be secured in a vertical, stored position by a turnbuckle and hook arrangement.

U.S. Pat. No. 4,400,129 discloses a carrier for attachment to a vehicle for loading and carrying objects such as a wheelchair. The carrier includes a vertical support member which carries a platform pivotally mounted at the upper end of the support. The carrier device is attached to the pivotal platform so that objects such as a wheelchair may be loaded. A hand-operated detent arrangement secures the pivotal member in either a horizontal or vertical, stored position.

U.S. Pat. No. 4,705,448 shows a carrier for small three-wheeled vehicles. The carrier is adapted for attachment to a motor vehicle and is a support member which is secured to the vehicle. The main support is provided with a member to pivot the carrier from a horizontal position upward to a position vertically aligned along the vehicle. The pivoting device also allows the carrier to tilt downwardly to the ground in order to receive or unload the three-wheeled vehicle.

While the above-referenced devices are representative of carriers found in the prior art, they are generally not convenient to use in connection with scooters which are heavy. Loading and unloading scooters from devices of this type can be a problem particularly for disabled individuals. Prior art devices also are often bulky and do not automatically fold to a compact stored position and automatically unfold, ready for use.

Accordingly, it is an object of the present invention to provide a structurally simple and convenient carrier which may be attached to a vehicle and easily operated by persons who are disabled or who suffer reduced ambulatory ability.

Another object of the present invention is to provide a carrier with a platform which may be raised and lowered with the vehicle aboard and assumes a position in which the platform is conveniently collapsed when empty.

Another object is to provide a vehicle-attachable carrier in which raising and lowering of the platform is controlled by a single switch.

Another object is to provide a vehicle-attachable carrier having a platform on which an auxiliary vehicle can be easily loaded and unloaded and which is automatically locked in position for transit when loaded.

Another object is to provide a vehicle attachable carrier having a platform which when unloaded will raise and automatically fold to a compact position.

Still another object of the present invention is the provision of a vehicle attachable carrier of a design which lends itself to production manufacturing procedures.

While the present invention will be described with reference to application for use in connection with three-wheeled vehicles or scooters of the type commonly used by people with walking limitations or disabilities, it will be apparent that the invention can be used in connection with the transportation of other items such as motorcycles, small vehicles, wheelchairs and the like.

Briefly, the carrier of the present invention includes a central support mast which is attachable to the chassis of a motor vehicle at a trailer hitch. The central mast includes a drive mechanism such as a ball screw actuator operated by a reversible dc motor connected to the electrical system of the vehicle. The motor is selectively actuated by an operator-controlled switch, preferably controlled by a key for safety and security. A foldable frame-supported platform is attached to the lower end of the lift mechanism. The platform has a central channel and two opposite ramps that receive the wheels of the vehicle to be transported so the vehicle can be driven on and off the platform. A pedal is responsive to the weight of the loaded vehicle and actuates a fold-up mechanism. The pedal senses the weight of a loaded vehicle wheel on the platform and through a shaft moves a fold-up pin on the platform up to a position which allows the platform to move upwardly in a horizontal position to elevate the vehicle above the ground to a transportation position. The upward movement of the platform will bring a portion of the platform into engagement with the hold-down arm lever causing a hold-down arm to pivot into engagement with the loaded vehicle to secure the vehicle on the platform. If the platform is unloaded, the fold-up pin will move into engagement with a fold-up lever on the mast as the platform is raised. Continued upward movement of the platform will cause the platform to pivot to a position generally vertical and abutting the mast for compactness. As the platform is moved downwardly from the folded position, the platform will, due to gravity and under assistance of a spring, move to the horizontal position.

A more complete understanding of the present invention will be had from the following drawings in which.

Figure 1:
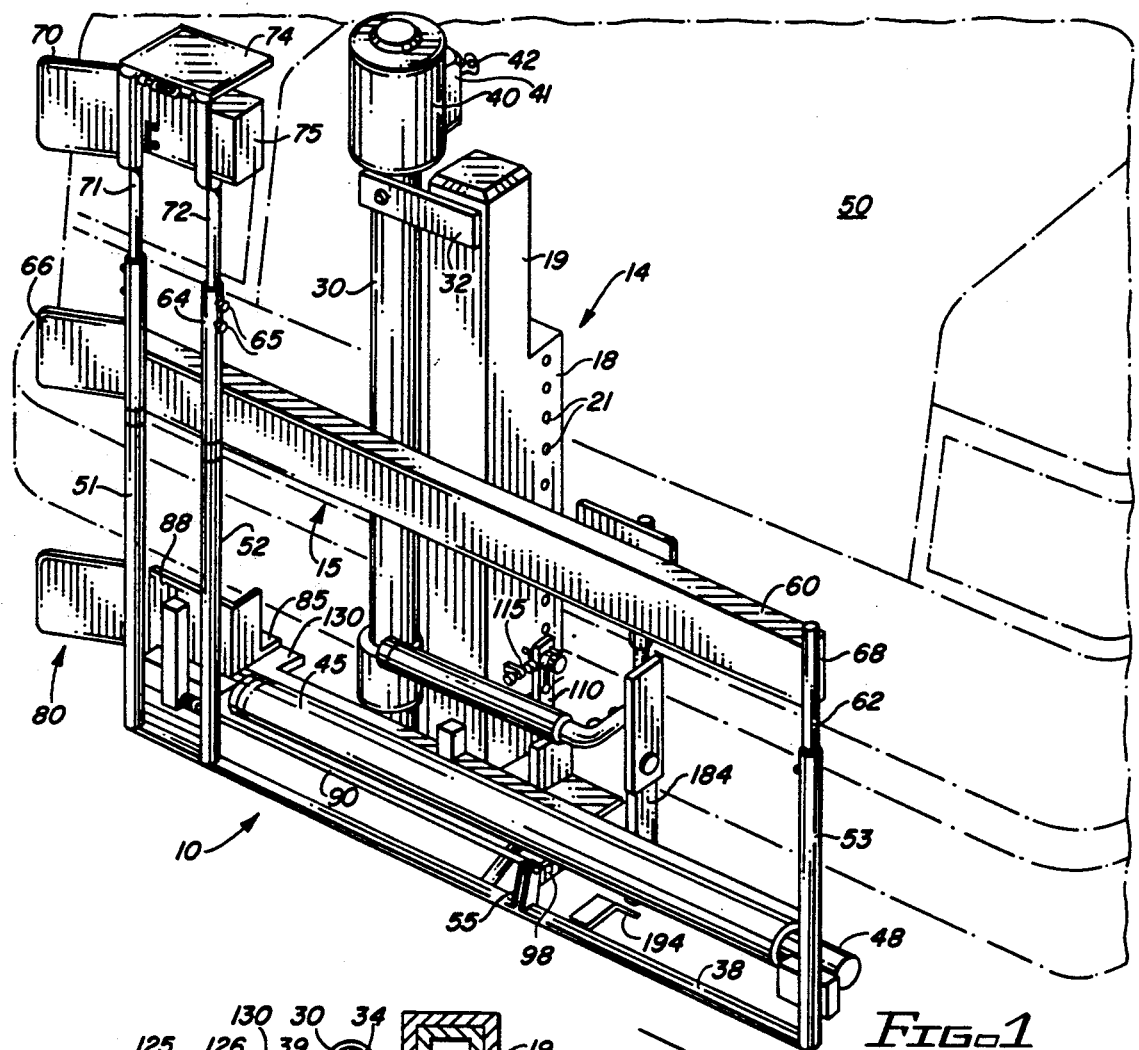
FIG. 1 is a perspective view of the carrier of the present invention mounted on an automobile bumper with the carrier in a folded position.
Figure 7:
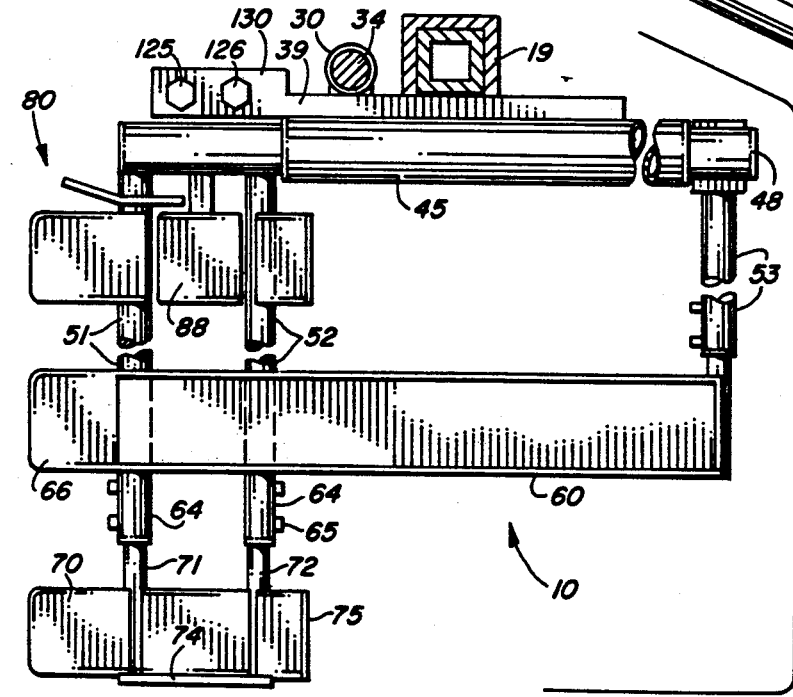
Figure 5:
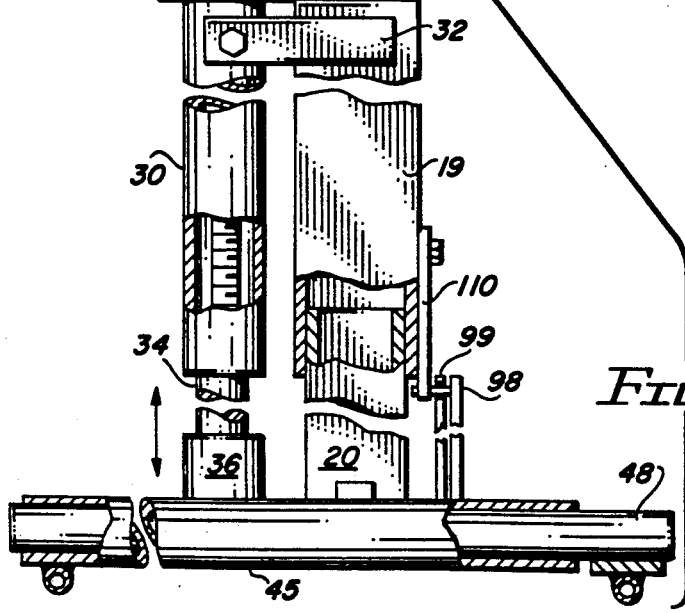
Figure 6:
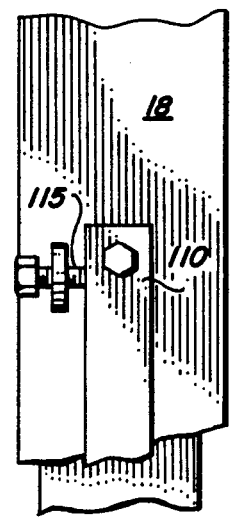
Figure 4A:
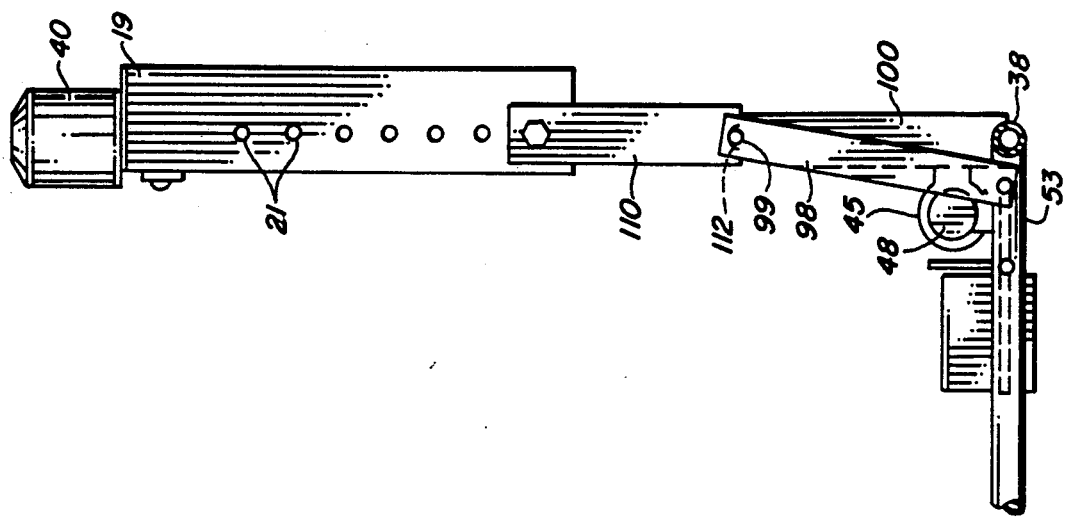
Figure 8:
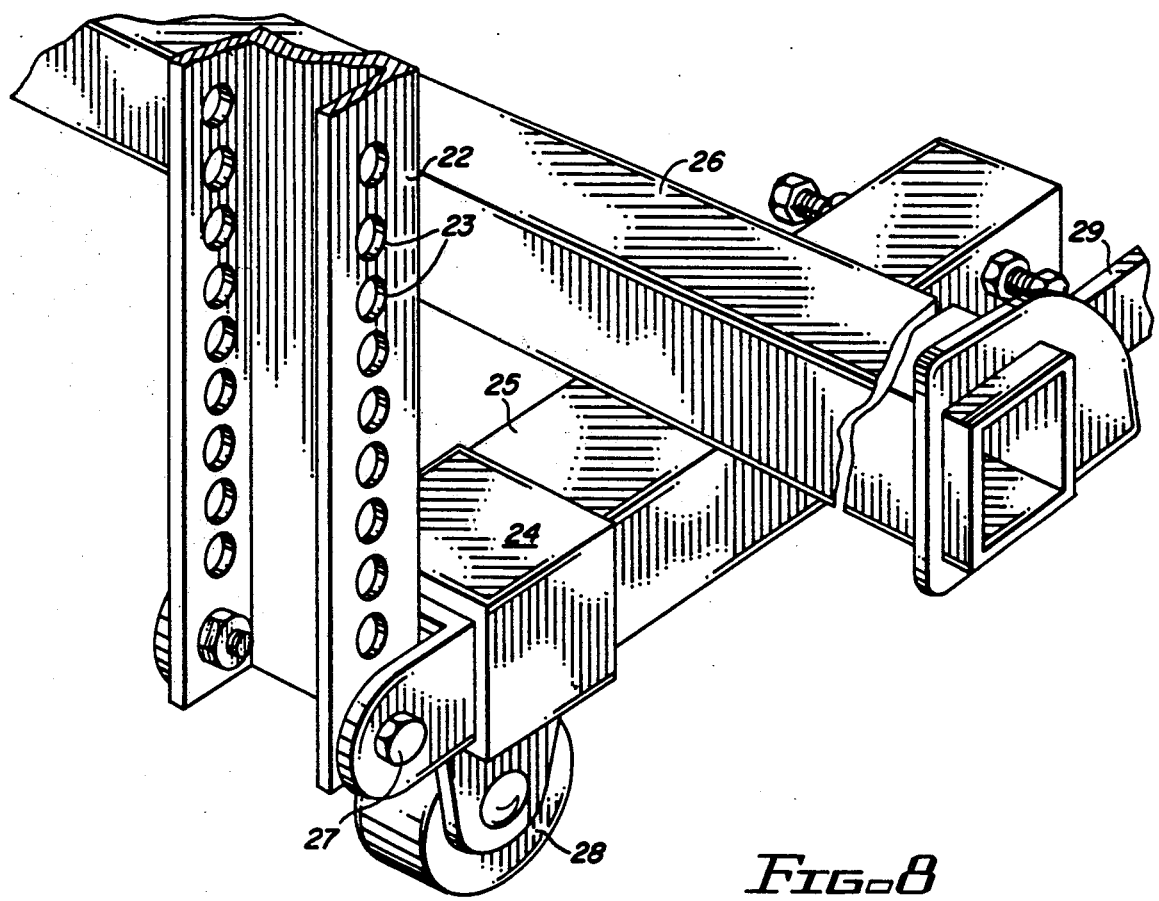

FIGS. 4A-4C sequentially illustrate the upward movement in a loaded position with the fold-down arm omitted for clarity;

FIGS. 4D-4E illustrate the upward movement and folding of the platform which occurs when the platform is not loaded;

FIG. 5 is a sectional view taken along lines 5—5 of FIG. 4D;

FIG. 6 is a detail view of a portion of the mast is indicated in FIG. 1;

FIG. 7 is a top view of the platform with the mast assembly shown in section; and FIG. 8 is a perspective view of the mounting bar and hitch assembly.

Figure 2:
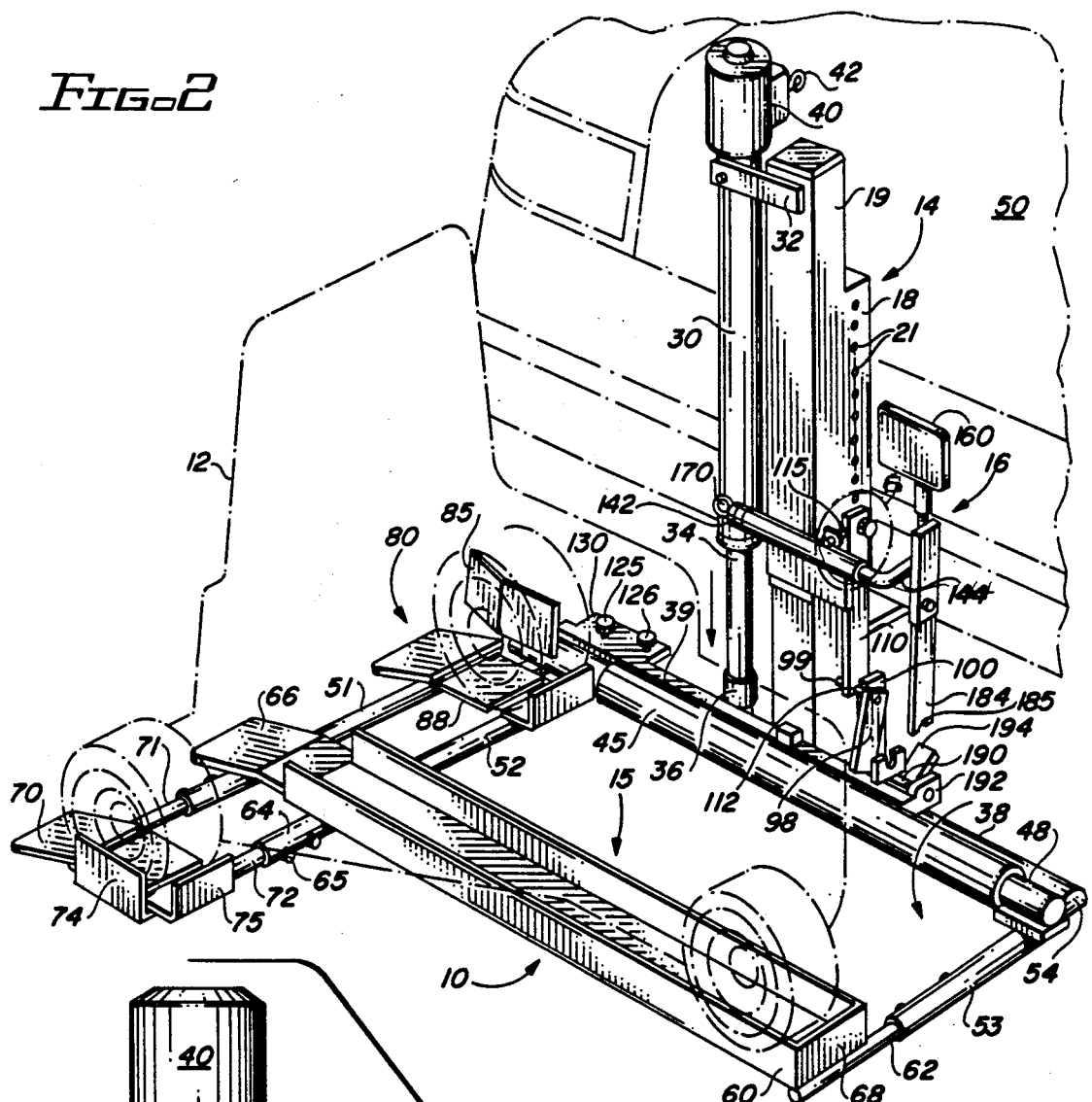
FIG. 2 is a perspective view of the carrier of the present invention in an unfolded position with the carrier mounted on the rear of an automobile bumper, the automobile and carried vehicle being shown in phantom lines.

Turning now to the drawings, particularly FIGS. 1 and 2, the carrier of the present invention is generally designated by the numeral 10. The carrier 10 is adapted particularly is a carrier for three-wheeled carts or scooters of the type generally designated by the numeral 12, shown in phantom lines in FIG. 2. A number of manufacturers make scooters of this type and the scooter shown is for purposes of representation only and is intended to be representative of the various scooters and other small vehicles that may be supported on the carrier 10. Typically these scooters are used by disabled individuals and are electrically driven having a front steering wheel and rear drive wheels as shown.

In general the carrier assembly includes several major components comprising the vertical mast assembly 14, the platform 15 and the hold-down mechanism 16. The carrier 10 is shown attached to the chassis of vehicle 50 at the rear bumper. Vehicle 50 is is shown as an automobile but may be any suitable transporting vehicle.

The mast assembly is generally designated by the numeral 14 and includes a generally vertically-positioned rectangular housing 19 which slidably receives tubular lift member 20. Housing 19 is provided with rearwardly extending flanges 18 each defining a vertically arranged column of spaced-apart holes 21. As best seen in FIG. 8, vertical mounting bar 22 has holes 23 alignable with the holes in the flanges 18 to adjust the height of the lift assembly relative to the ground. The mounting bar 22 has a horizontal, generally rectangular support member 24 which is slidably received within the receiver section 25 of trailer hitch 26 secured to the vehicle frame by welding or by bolts at members 29. Trailer hitch 26 may be a custom built hitch or a universal hitch design. The mast may be pivotal about bolts 27 to allow the entire carrier to be moved to a generally horizontal position to provide unobstructed access to the rear luggage compartment of the vehicle 50.

A ball screw actuator 30 is vertically secured at one side of the lift housing by a bracket 32. The actuator has an extensible rod 34 which is secured by a clevis arrangement 36 to the platform frame member 38. The actuator is reversibly operable by means of electric motor 40 which is interconnected to the electrical system of the vehicle and is controlled by keyswitch 41 by the operator. Insertion of the key 42 and rotation of the key in one direction will cause the rod and attached platform 15 to raise, while insertion and rotation of the key in the other direction will cause the platform 15 to lower. Appropriate limit switches control the upper and lower extent of travel of the rod. The interconnection of the motor to the vehicle electrical system is easily accomplished by a mechanic and should include a suitable fuse in the hot wire.

Platform 15 includes a transversely extending cylindrical housing 45. The term "transverse" is used herein to indicate a direction generally parallel to the bumper of the vehicle 50 and transverse to the longitudinal axis of the vehicle while longitudinal indicates or refers to an axis corresponding to the longitudinal axis of the vehicle 50. "Front" and "rear" refer to direction corresponding to the front and rear of the vehicle. Transversely extending tubular housing 45 is secured to the frame member 39 at lower end of the mast at a location to the rear of mast and rod 36. A pivot shaft 48 is rotatable within housing 45 and longitudinally extending tubular frame members 51, 52 and 53 are secured to the pivot shaft and are generally perpendicular thereto. The front ends of tubes 51, 52 and 53 are connected by tubular frame member 54. As shown, the outer most tubes 51, 53 form the opposite sides of the platform frame and member 54 the forward edge. Tubes 51 and 52 are disposed adjacent one another on the left side of the platform as seen in FIGS. 1 and 2.

A generally U-shaped channel member 60 extends transversely of tubes 51, 52 and 53 having a rod 62 telescopically received within tube 53. Similarly, sleeves 64 are disposed on the underside of the channel 60 and slidable about tubes 51, 52 to provide relative adjustment of the longitudinal position of the channel 60 on the platform. Channel 60 is adapted to receive the front or steering wheel of the scooter 12 is seen in FIG. 2. This construction allows the platform to be conveniently adjusted to accomodate various sizes and models of scooters.

The left end of channel 60 is provided with a downwardly inclined platform or ramp 66 to facilitate loading the scooter 12 so that the front wheel can be driven directly into the channel. The opposite or right end of channel 60 is provided with a chock plate 68 to engage and retain the front wheel when the scooter is in the proper loaded position.

A ramp 70 is attached to support rods 71, 72 which are, in turn, telescopically received in tubular members 51 52. The ramp is provided with stops 74, 75 which engage the inside wall and tread of the outer most rear wheel of the scooter in the loaded position as seen in FIG. 2. Set screws 65 secure the ramp in position once adjusted.

Ramp 80 is oppositely disposed from ramp 70 to receive the inner most rear wheel of the scooter having an inclined section for convenience of loading and unloading. A vertical plate 85 extends from tube 45 to guide the inner rear wheel of the scooter properly onto the platform. Ramp 80 also includes a pedal plate 88 mounted to pivot shaft 90 on the underside of the plate as best seen in FIG. 1. It will be apparent that when a cart is in the loaded position on the ramp, the weight of the inboard rear wheel will cause pedal 88 to move downward slightly. The depression of the pedal will cause rotation of pivot shaft 90 which extends along the cylindrical pivot housing 45. The distal end of the shaft is received in projecting flanges 55 at a location along the housing 45. A vertically extending fold-up lever 98 is secured to the shaft 90 and rotates through a small arc as a result of depression of the pedal 88. Pedal 88 operates fold-up lever 98 to control the folding of the platform about the axis of the housing 45 and axle 48 as will be explained in detail hereafter.

When the platform 15 is raised in an unloaded position, fold-up lever 98 will assume a position causing the platform 15 to pivot to a generally vertical position. To this end, the upper end of the fold-up lever 98 is provided with a horizontally-extending fold-up pin 99. A stop member 100 is mounted adjacent the hold-down lever and has a slot 102 which receives fold-up pin 99 in the non-actuated position. Detent bar 110 extends vertically downward being affixed at its upper end to the side of the mast and having an open-ended slot 112 at its lower end.

As mentioned above, the position of the fold-up lever 98 controls folding of the platform. In a condition when the platform is lowered to a ground-engaging position without a load, the platform will pivot to a generally horizontal position with the fold-up lever assuming the position as shown in FIG. 4D with the pin 99 aligned with slot 112 in the fixed detent bar 110. Gravity will cause the platform to unfold when lowered although a spring assist may be desirable. In the lowered position pin 99 extends transversely so as to be engageable in the lower open-end slot of the detent bar 110. As platform 15 is raised to a predetermined height, pin 99 will engage slot 112 and continued upward movement of the mast and platform under the influence of the screw 30, will cause the shaft 48 of platform 15 to pivot about the pivot tube 45 as shown in FIG. 4E since the frame member of the platform is restrained by the fold-up lever and detent. As seen in FIG. 6, adjustment screws 115 are provided on the mast to precisely adjust the position of the bar 110 and its associated slot to provide alignment with the pin 99. Continued upward movement of the mast will pivot the platform to a fully folded, compact position as shown in FIG. 1.

If, on the other hand, the platform is in the lowered horizontal position, as seen in FIG. 4A, and a vehicle such as a scooter is driven onto the platform the weight of the inboard wheel of the scooter will depress lever 88 causing shaft 90 to rotate fold-up lever 98 rearwardly to a position out of alignment with the detent bar, as seen in FIG. 4B. As platform 15 is raised, fold-up pin 99 will clear the lower end of the detent bar 110 allowing the platform to elevate in a horizontal position to a transportation position as seen in FIG. 4C. In this position, the platform is well clear of the ground at approximately bumper height and the supported scooter 12 may be transported by the carrier vehicle.

The horizontal orientation or pitch of the platform 15 is adjustable by means of set screws 125 and 126 which extend through plate 130 secured to housing 45. In the fully unfolded position, the lower end of these screws will engage tab 132 at the inner edge of the platform. By extending or retracting the screws, the pitch of the entire platform can be accordingly adjusted.

Figure 3B:
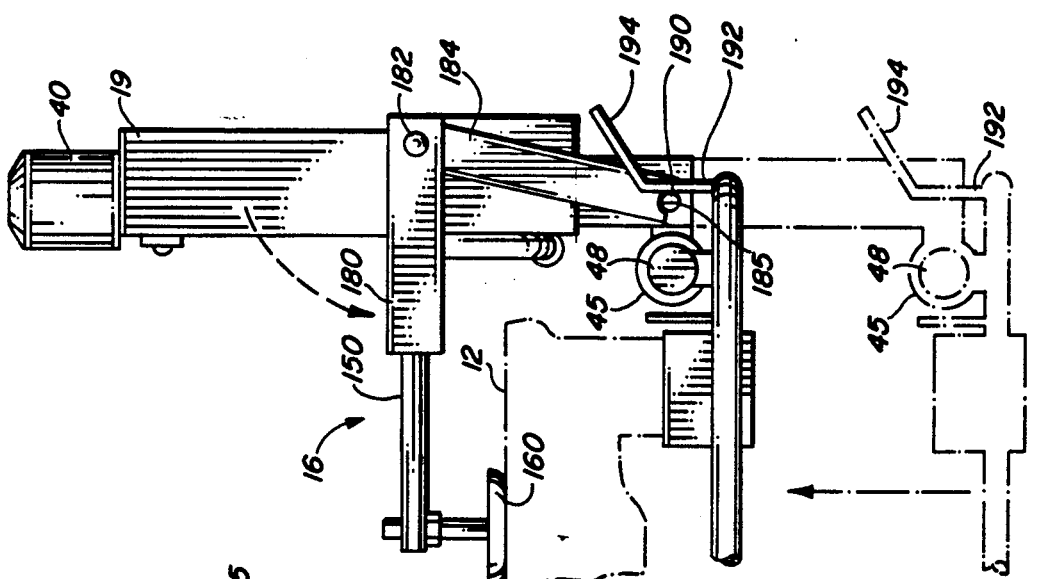
FIGS. 3A-3B illustrate the upward movement of the platform in a loaded condition and actuation of the hold-down arm with certain components omitted for clarity.
Figure 3A:
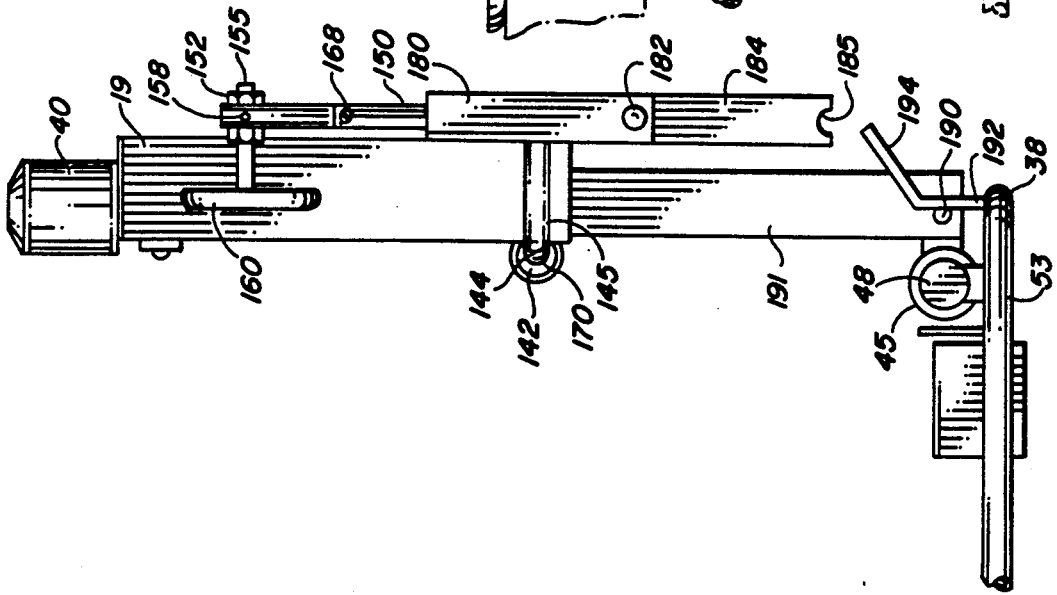

A further feature of the present invention is the inclusion of an automatic hold-down assembly 16 which engages the floor of the scooter 12 or other portion of the vehicle being transported to secure the vehicle to the platform during transportation. The hold-down assembly 16 is best seen in FIGS. 2, 3A and 3B and includes a tube 142 secured to the front of the mast housing 19. L-shaped arm 144 is pivotal within tube 142 and has a section 145 which extends forwardly toward the vehicle. A hold-down arm 150 extends from the distal end of arm section 145 vertically along the mast. The distal end of the hold-down arm 150 carries a mounting ring 152 which slidably receives rod 155. The end of the rod carries a foot member 160 which engages the transported apparatus in the actuated position. The relative position of the foot 160 to the hold-down arm may be adjusted at ring 152 and when the proper adjustment is reached, secured by means of set screw 158. Similarly the length of arm 150 may be telescopically adjusted and when adjusted, secured by set screw 168. Helical return spring 170 will cause arm 144 to return to the non-actuated position with arm 150 aligned along the side of the mast when the platform is in the fully lowered position shown in FIGS. 2 and 3A.

A bar 180 is secured to the lower end of arm 150 and hold-down lever 184 is pivotally connected to the bar 180 at a pivot point 182 below arm 144 as seen in FIG. 3A. Lever 184 has an open-ended slot 185 at its lower, distal end.

The operation of the hold-down arm is controlled by horizontally-extending pin 190 mounted on bracket 192. Pin 190 is generally parallel to housing 45 and aligned with slot 185. Guide plate 194 inclines forwardly from bracket 192 and serves to guide the lower end of the hold-down lever 184 onto the pin when the platform is loaded and elevates in a horizontal position. As seen in FIG. 3B, raising the platform in a loaded position will bring pin 190 into engagement with the slot 185 at the lower end of the hold-down lever 184. Further upward movement of the platform will cause the hold-down arm 150 to pivot about pivot point 182 bringing the foot 160 into contact with the vehicle 12 on the platform as seen in FIG. 3B. Foot 160 may be adjusted by means of set screws 158 and ring 152 to adjust the effective length of the arm 150 and the position of the foot 160 relative to the arm so as to provide secure engagement with the scooter for transportation.

In the event the platform is raised in an unloaded position, the platform will begin to pivot to the vertical, folded position when the hold detent bar 110 engages the fold-up pin 99. Fold-up lever 98 and hold-down lever 184 are relatively positioned so that the platform folding operation is initiated before the slot 185 in the lower end of hold-down lever 184 engages pin 190. Initiation of the folding of the platform as seen in FIG. 4E will pivot the hold-down pin 190 and guide plate 194 to a position to clear the lower end of hold-down lever 184 preventing actuation of the hold-down assembly. Thus, the hold-down arm will remain in the position shown in FIG. 1 along the side of the mast allowing the platform 15 to fold to a vertical position adjacent the mast.

In use, the carrier of the present invention can be conveniently installed at the bumper of a vehicle at any conventional hitch 26, as shown in FIG. 8. The conventional hitch 26 is provided with a receiver tube 25 which receives the tubular extension of the mast and in position can be secured in place by bolts or other fasteners. The vertical position of the mast is adjusted in accordance with the vehicle at alignment bores 23 in the mast on the support. Once in position, the motor 40 is connected to the electrical system of the vehicle and the carrier is ready for operation. A skid wheel may be provided on the bottom of the hitch assembly as seen in FIG. 8.

In order to load a scooter or other object as a scooter or motorized cart onto the carrier, the control key 42 is turned to extend rod 34, causing the platform 15 to unfold to a horizontal position and lower to a position in engagement with the ground as seen in FIG. 2. In this position, the ramps 66, 70 and 80 allow the scooter or cart 12 to be driven onto the platform with the steering wheel supported in the transversely extending channel 60. When the scooter or cart is properly positioned on the platform, the rear wheels of the scooter will be in engagement and will be positioned on the ramp. The weight of the inboard wheel on pedal 88 will cause the pedal to be depressed, rotating shaft 94, pivoting the fold-up lever 98 and pin rearwardly. Upon actuation of the lift by appropriate rotation of the key 42, the jack 30 will retract bringing the lift and attached platform 15 upwardly. Fold-up level 98 will pass in front of detent bar 110 due to the forwardly pivoted position of the lever 98. As the platform moves upwardly, the slot 185 in the lower end of the hold-down lever 184 will engage the pin 190, assisted if necessary by the rearwardly extending deflector or guide plate 194. This engagement will, as the platform moves upwardly, cause the hold-down arm 150 to be rotated forwardly as lever 184 is moved upwardly. The platform will continue to move upwardly until the platform is in the fully raised position with the foot 160 of the hold-down arm engaging and securing the loaded scooter. The vehicle 50 can then be driven and the scooter or cart transported at the rear of the vehicle in a secure position. When the vehicle arrives at a location where it is desired to use the transported scooter or cart, the motor 40 is energized by key 42 to horizontally lower the platform to a ground-engaging position. As the platform moves downwardly, lower end of the hold-down lever 184 will disengage from its associated pin and the hold-down arm 150, under the influence of spring 170, will return to the vertical position shown in FIG. 2 out of engagement with the scooter permitting the cart or scooter to be removed from the platform.

If the platform is raised without a load on the platform, the upward movement of the platform will bring the lower end of the fold-up lever 98 into engagement with the fold-up pin 99 causing the platform to rotate to a generally vertical position along side the mast. The folding of the platform will cause the fold-down lever to clear the hold-down pin allowing the hold-down arm to remain in the non-engaging position shown in FIG. 1.

It will be seen that the loading and transportation carrier of the present invention is well adapted to achieve the advantages and objectives mentioned above. While a preferred embodiment of the invention has been described herein, numerous changes, alterations and modifications in the construction and arrangement of parts can be made by those skilled in the art. To the extent these changes, alterations and modifications do not depart from the spirit and scope of the appended claims, they are intended to be encompassed therein.

I claim:

1. A vehicle-attachable carrier for transporting an object comprising:
    (a) a mast having a vertical lift apparatus associated therewith which life is selectively movable in an upward and downward direction said mast having an engagement member;
    (b) means for detachably securing said mast to a vehicle;
    (c) a platform operatively connected to said lift apparatus for supporting the object, said platform including a frame and pivotal from a horizontal position to a generally vertical position about a pivot axis; and
    (d) a fold control means for controlling folding of said platform including:
        (i) fold-up means for selectively engaging said engagement member, said fold-up means having a first position in engagement with said engagement member whereby said platform will pivot to said vertical position upon upward movement of said lift and a second position out of engagement with said engagement member; and
        (ii) load responsive means responsive to the presence of an object supported on the platform for moving said fold-up means to said second position to maintain said platform in said horizontal position.

2. The carrier of claim 1 wherein said load responsive means comprises a weight-responsive pedal connected through a shaft to said fold-up means.

3. The carrier of claim 2 wherein said platform includes a transversely-extending wheel channel and wheel supports disposed on opposite sides of said wheel channel.

4. The carrier of claim 3 wherein said weight-responsive pedal is associated with one of said wheel supports.

5. The carrier of claim 2 further including leveling means for adjusting the pitch of the platform.

6. The carrier of claim 3 wherein said frame includes telescopic member for selectively adjusting the position of the said wheel channel and at least one of said wheel supports.

7. The carrier of claim 2 further including:
    (a) a hold-down lever having a load-engaging foot, said hold-down lever having a first out-of-the-way position and a second load-engaging position; and
    (b) actuator means for moving said hold-down lever to said second position when said platform is loaded.

8. The carrier of claim 7 wherein said hold-down lever is pivotally connected to said mast and said actuator means includes a link positioned to engage said platform when said platform is raised in a generally horizontal position.

9. The carrier of claim 2 wherein said lift apparatus includes a ball screw actuator driven by an electric motor.

10. The carrier of claim 9 wherein said electrical motor is a reversible d.c. motor controlled by an operator-controlled manual key switch.

11. The carrier of claim 2 wherein said means for detachably securing said mast to a vehicle comprises a tube attached to said mast and adapted to be slidably receivable in a vehicle-mounted trailer hitch.

* * * * *